United States Patent
Howe et al.

(10) Patent No.: US 12,522,342 B2
(45) Date of Patent: Jan. 13, 2026

(54) FAIRING FOR WING-MOUNTED ENGINES

(71) Applicant: The Boeing Company, Arlington, VA (US)

(72) Inventors: Sean P. Howe, Mount Pleasant, SC (US); Zachary C. Hoisington, Seal Beach, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/156,039

(22) Filed: Jan. 18, 2023

(65) Prior Publication Data
US 2023/0278717 A1 Sep. 7, 2023

Related U.S. Application Data

(60) Provisional application No. 63/317,144, filed on Mar. 7, 2022.

(51) Int. Cl.
*B64D 29/02* (2006.01)
*B64C 3/36* (2006.01)
(Continued)

(52) U.S. Cl.
CPC .................. *B64C 7/00* (2013.01); *B64C 3/36* (2013.01); *B64D 27/40* (2024.01); *B64D 27/402* (2024.01); *B64D 27/404* (2024.01); *B64D 29/02* (2013.01)

(58) Field of Classification Search
CPC ............ B64D 29/02; B64D 27/40; B64C 3/36
See application file for complete search history.

(56) References Cited

U.S. PATENT DOCUMENTS

| | | | | |
|---|---|---|---|---|
| 3,831,888 A | * | 8/1974 | Baker .................... | B64D 27/40 244/54 |
| 4,867,394 A | * | 9/1989 | Patterson, Jr. ......... | B64D 27/18 244/54 |

(Continued)

FOREIGN PATENT DOCUMENTS

FR      2 898 336      9/2007

OTHER PUBLICATIONS

Kutney J T et al: "Reduction of drag rise on Convair 990 Airplane", Journal of Aircraft, AIAA—American Institute of Aeronautics and Astronautics, Inc, US, vol. 1, No. 1, Jan. 1, 1964 (Jan. 1, 1964), pp. 8-12, XP001247865, (Year: 1964).*

(Continued)

*Primary Examiner* — Kimberly S Berona
*Assistant Examiner* — Steven J Shur
(74) *Attorney, Agent, or Firm* — Walters & Wasylyna LLC

(57) ABSTRACT

An aircraft includes a wing having a longitudinal centerline axis, a leading edge, a trailing edge aft of the leading edge, a wing thickness, and a wing chord, an engine having a longitudinal axis vertically aligned with the wing chord and parallel to the longitudinal centerline axis, a pylon connecting the wing to the engine, and a fairing received over the pylon. The fairing defines a horizontal plane, a first plane perpendicular to the longitudinal axis, and a second plane perpendicular to the longitudinal axis, the second plane being aft of the first plane, the longitudinal axis defining a reference line when projected onto the horizontal plane. The fairing includes a fairing body defining an aerodynamic surface having an outboard portion and an inboard portion configured such that the first plane intersects the horizontal plane and the aerodynamic surface of the inboard portion at a first intersection point. The first intersection point is (Continued)

laterally displaced from the reference line by a first distance. The second plane intersects the horizontal plane and the aerodynamic surface of the inboard portion at a second intersection point. The second intersection point is laterally displaced from the reference line by a second distance. The second distance is greater than the first distance.

20 Claims, 5 Drawing Sheets

(51) Int. Cl.
    *B64C 7/00*              (2006.01)
    *B64D 27/40*          (2024.01)

(56) References Cited

U.S. PATENT DOCUMENTS 5,443,230 A * 8/1995 Lord .................. B64C 7/02
                                                      244/54

2008/0001036 A1 * 1/2008 Voogt .................. B64C 9/22
                                                      244/215
2009/0032639 A1 * 2/2009 Dantin .................. B64D 29/02
                                                       244/37

OTHER PUBLICATIONS

Guenot et al.: "Aerodynamic Optimization of a Parametrized Engine Pylon on a Mission Path Using the Adjoint Method," *6th European Conference on Computational Mechanics and 7th European Conference on Computational Fluid Dynamics* (2018).

European Patent Office, Extended European Search Report, App. No. 23160346.5 (Jul. 7, 2023).

Kutney J.T. et al: "Reduction of Drag Rise on Convair 990 Airplane," *Journal of Aircraft, AIAA—American Institute of Aeronautics and Astronautics, Inc, US*, vol. 1, No. 1 pp. 8-12 (Jan. 1, 1964).

European Patent Office, "Communication pursuant to Article 94(3) EPC," App. No. 23160346.5 (Nov. 12, 2024).

* cited by examiner

FAIRING FOR WING-MOUNTED ENGINES

PRIORITY

This application claims priority from U.S. Ser. No. 63/317,144 filed on Mar. 7, 2022.

FIELD

The present disclosure is generally related to aerospace structures and, more particularly, to fairings and methods for reducing drag on an aircraft.

BACKGROUND

Aircraft having wing-mounted engines typically utilize support structures, such as pylons, to support engines relative to the wings. Many aircraft experience high amount of interference, such as drag, around the engine and pylon juncture, thus risking damage and detrimental effects to the aircraft. Current solutions for reducing drag and interference include moving the engine location, slowing the travel speed of the aircraft, or changing geometry of the wing. These solutions are not ideal because they may increase weight, increase time to complete a flight, and changing the wing shape may not be possible for different airplane configurations.

Accordingly, those skilled in the art continue with research and development efforts in the field of improving structures and methods for reducing drag on aircraft.

SUMMARY

The following is a non-exhaustive list of examples, which may or may not be claimed, of the subject matter according to the present disclosure.

Disclosed are fairings for an aircraft. The aircraft defines a longitudinal centerline axis and includes a wing having a leading edge, a trailing edge aft of the leading edge, a wing thickness, and a wing chord. The aircraft further includes an engine having a longitudinal axis vertically aligned with the wing chord and parallel to the longitudinal centerline axis of the aircraft. The aircraft further includes a pylon connecting the wing to the engine. The fairing is received over the pylon. The fairing defines a horizontal plane, a first plane perpendicular to the longitudinal axis, and a second plane perpendicular to the longitudinal axis, the second plane being aft of the first plane, the longitudinal axis defining a reference line when projected onto the horizontal plane.

In an example, the disclosed fairing includes a fairing body defining an aerodynamic surface. The aerodynamic surface includes an outboard portion and an inboard portion, the inboard portion being configured such that the first plane intersects the horizontal plane and the aerodynamic surface of the inboard portion at a first intersection point. The first intersection point is laterally displaced from the reference line by a first distance. The second plane intersects the horizontal plane and the aerodynamic surface of the inboard portion at a second intersection point. The second intersection point is laterally displaced from the reference line by a second distance. The second distance is greater than the first distance.

Also disclosed are methods for reducing drag on an aircraft. The aircraft defines a longitudinal centerline axis and includes a wing having a longitudinal centerline axis, a leading edge, a trailing edge aft of the leading edge, a wing thickness, and a wing chord. The aircraft further includes an engine having a longitudinal axis vertically aligned with the wing chord and parallel with the longitudinal centerline axis of the aircraft. The aircraft further includes a pylon connecting the wing to the engine. The aircraft further includes a fairing. The fairing defines a horizontal plane, a first plane perpendicular to the longitudinal axis, and a second plane perpendicular to the longitudinal axis, the second plane being aft of the first plane, the longitudinal axis defining a reference line when projected onto the horizontal plane.

In an example, the method includes positioning the fairing over the pylon. The fairing includes a fairing body defining an aerodynamic surface. The aerodynamic surface includes an outboard portion and an inboard portion, the inboard portion being configured such that the first plane intersects the horizontal plane and the aerodynamic surface of the inboard portion at a first intersection point. The first intersection point is laterally displaced from the reference line by a first distance. The second plane intersects the horizontal plane and the aerodynamic surface of the inboard portion at a second intersection point. The second intersection point is laterally displaced from the reference line by a second distance. The second distance is greater than the first distance.

Other examples of the disclosed fairings and methods will become apparent from the following detailed description, the accompanying drawings, and the appended claims.

DETAILED DESCRIPTION

Figure 1:
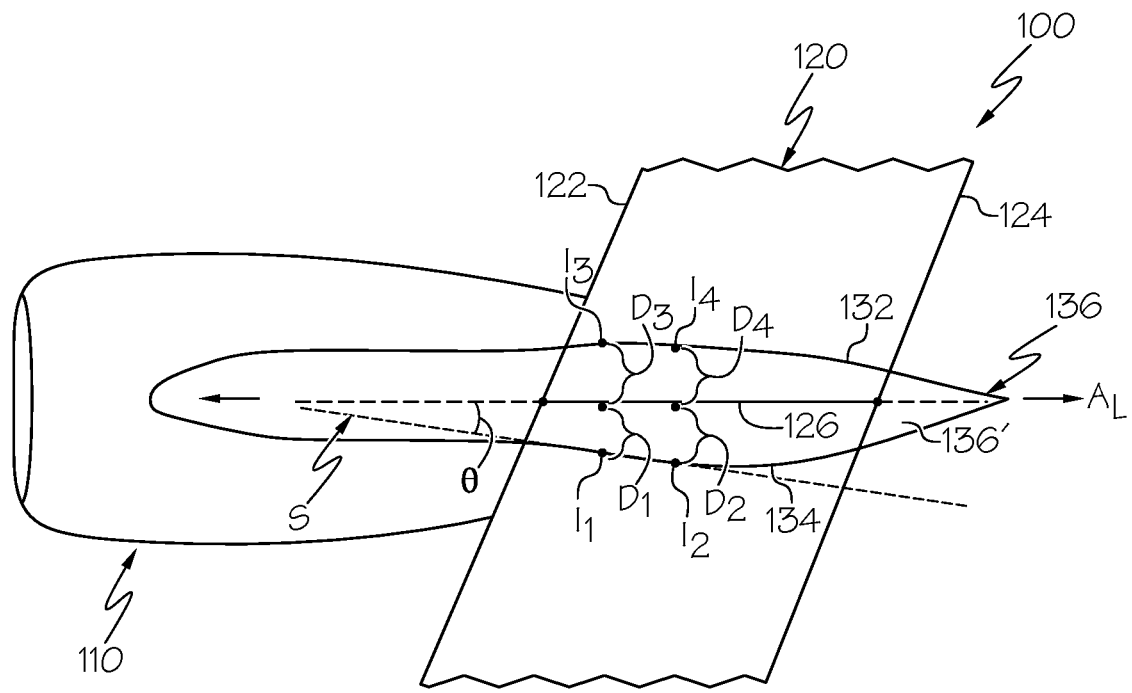
FIG. 1 is a schematic top cross-sectional view of a portion of an aircraft.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according to the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring to FIG. 1, disclosed is a fairing 130 for an aircraft 100. The fairing 130 is configured such that it reduces engine 130 and airframe interference effects at high speeds, such as speeds around and greater than Mach 0.70. The fairing 130 design considerations include torque box and shield. The geometry of the disclosed fairing 130 may be outwardly angled from a longitudinal axis $A_L$ of the engine 110 near the wing 120 lower surface for the first about ⅓ of the wing chord or greater to reduce and eliminate shock wave at cruise resulting from the engine 110. The disclosed fairing 130 is further configured to reduce drag rise growth at elevated Mach numbers, such as approximately Mach 0.70 and higher. Further, the disclosed fairing 130 is configured to reduce rise of shock-induced separation and potentially damaging loads on the aircraft 100. The disclosed fairing 130 may be ideal for a smaller aircraft 100 having a stiff and or thin wing, such as a single-aisle aircraft.

Figure 7:
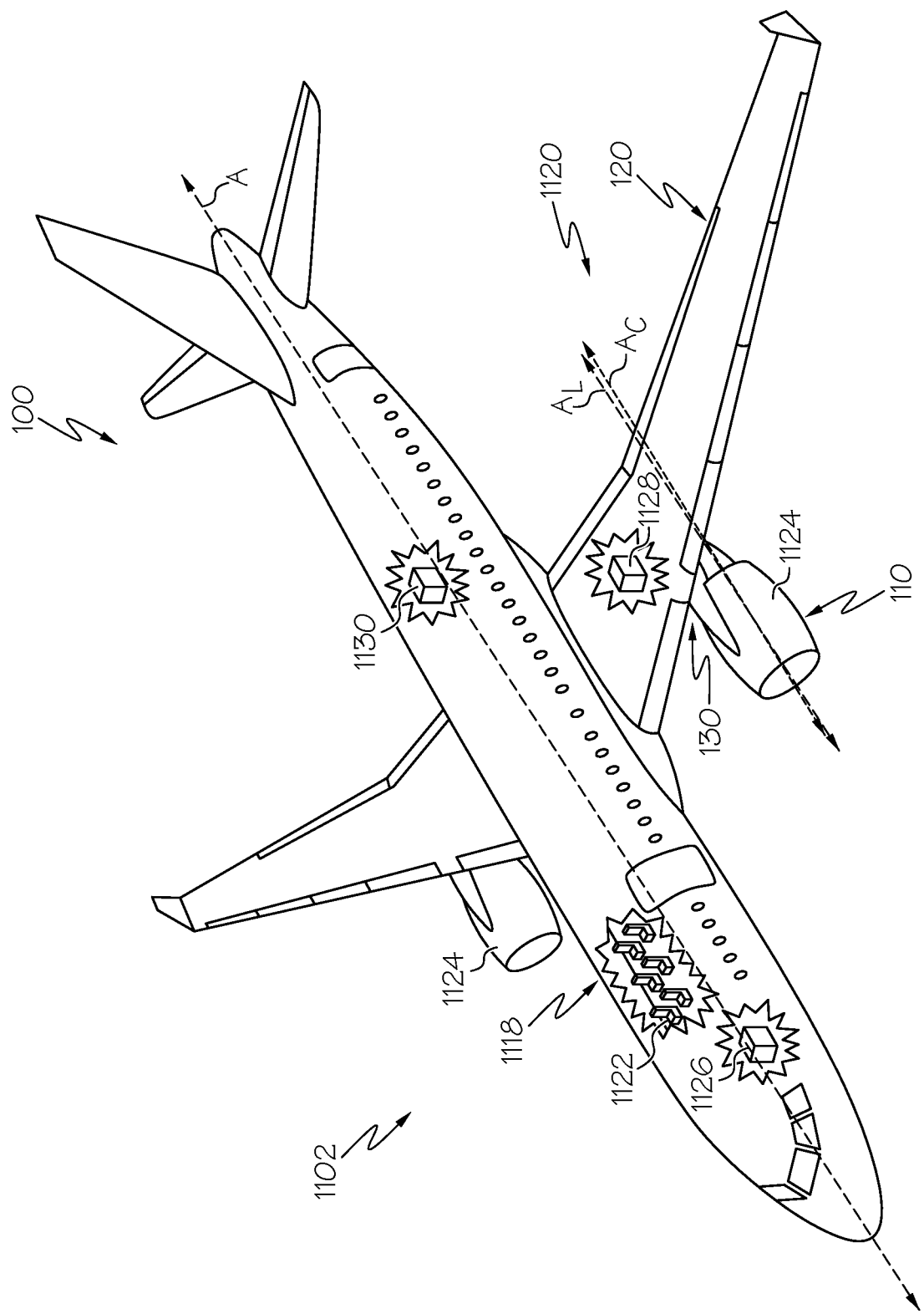
FIG. 7 is a schematic block diagram of an example of an aircraft.

Still referring to FIG. 1 and FIG. 7, the aircraft 100 defines a longitudinal centerline axis A and includes a wing 120 having a leading edge 122, a trailing edge 124 aft of the leading edge 122, a wing thickness $T_W$, and a wing chord 126. The aircraft 100 further includes an engine 110. The aircraft 100 further includes a pylon 140 connecting the wing 120 to the engine 110.

Figure 2:
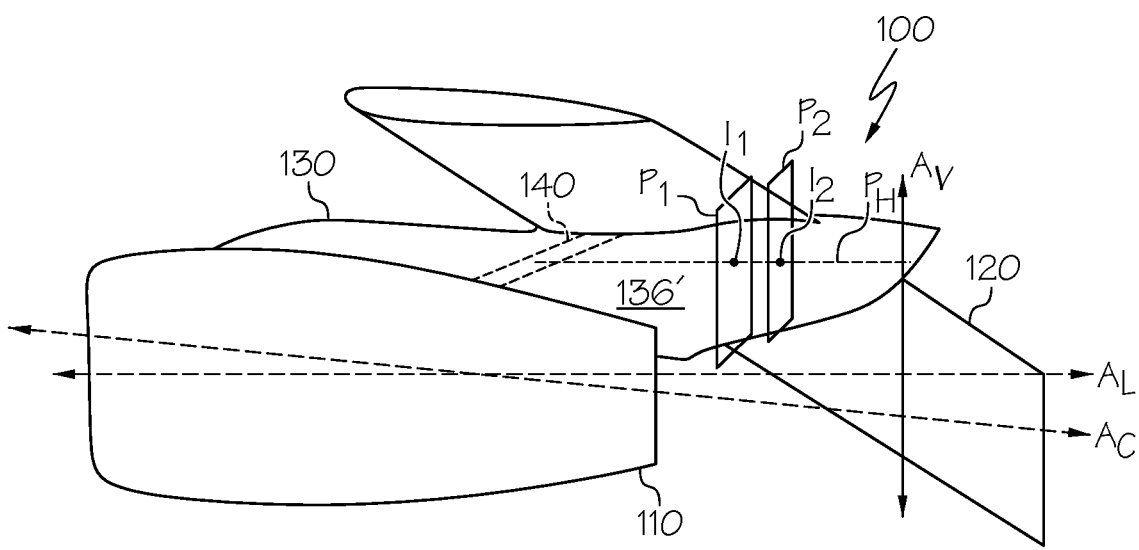
FIG. 2 is a schematic side perspective view of the portion of the aircraft of FIG. 1.

The engine 110 defines a longitudinal axis $A_L$ (FIGS. 1 and 2) that is vertically aligned with the wing chord 126 and parallel to the longitudinal centerline axis A of the aircraft 100. The engine 110 further defines a center axis $A_C$, as shown in FIG. 2. In one example, the center axis $A_C$ is aligned with the longitudinal axis $A_L$. In another example, the center axis $A_C$ is offset from the longitudinal axis $A_L$ by between about 1 degree to about 10 degrees, such as when the engine 110 is mounted to face slightly inward (or outward) relative to the longitudinal centerline axis A of the aircraft 100.

In one or more examples, the fairing 130 is received over the pylon 140. The fairing 130 defines a horizontal plane $P_H$, a first plane $P_1$ perpendicular to the longitudinal axis $A_L$, and a second plane $P_2$ perpendicular to the longitudinal axis $A_L$, see FIG. 2. The horizontal plane $P_H$ may bisect the fairing 130. Likewise, the first plane $P_1$ and the second plane $P_2$ may bisect the fairing 130. The second plane $P_2$ is aft of the first plane $P_1$. The longitudinal axis $A_L$ of the engine 110 defines a reference line $L_R$ when projected onto the horizontal plane $P_H$, see FIG. 3.

Still referring to FIG. 1, in one or more examples, the fairing 130 includes a fairing body 136 that defines an aerodynamic surface 136'. The aerodynamic surface 136' is a single, monolithic piece that defines an outboard portion 132 and an inboard portion 134. In one or more examples, the inboard portion 134 of the aerodynamic surface 136' has a different geometry than the outboard portion 132 of the aerodynamic surface 136'.

The inboard portion 134 is configured such that the first plane $P_1$ intersects the horizontal plane $P_H$ and the aerodynamic surface 136' of the inboard portion 134 of the fairing body 136 at a first intersection point $I_1$. The first intersection point $I_1$ is laterally displaced from the reference line $L_R$ by a first distance $D_1$.

The second plane $P_2$ intersects the horizontal plane $P_H$ and the aerodynamic surface 136' of the inboard portion 134 of the fairing body 136 at a second intersection point 12. The second intersection point 12 is laterally displaced from the reference line $L_R$ by a second distance $D_2$. In one example, the second distance $D_2$ is greater than the first distance $D_1$.

Figure 3:
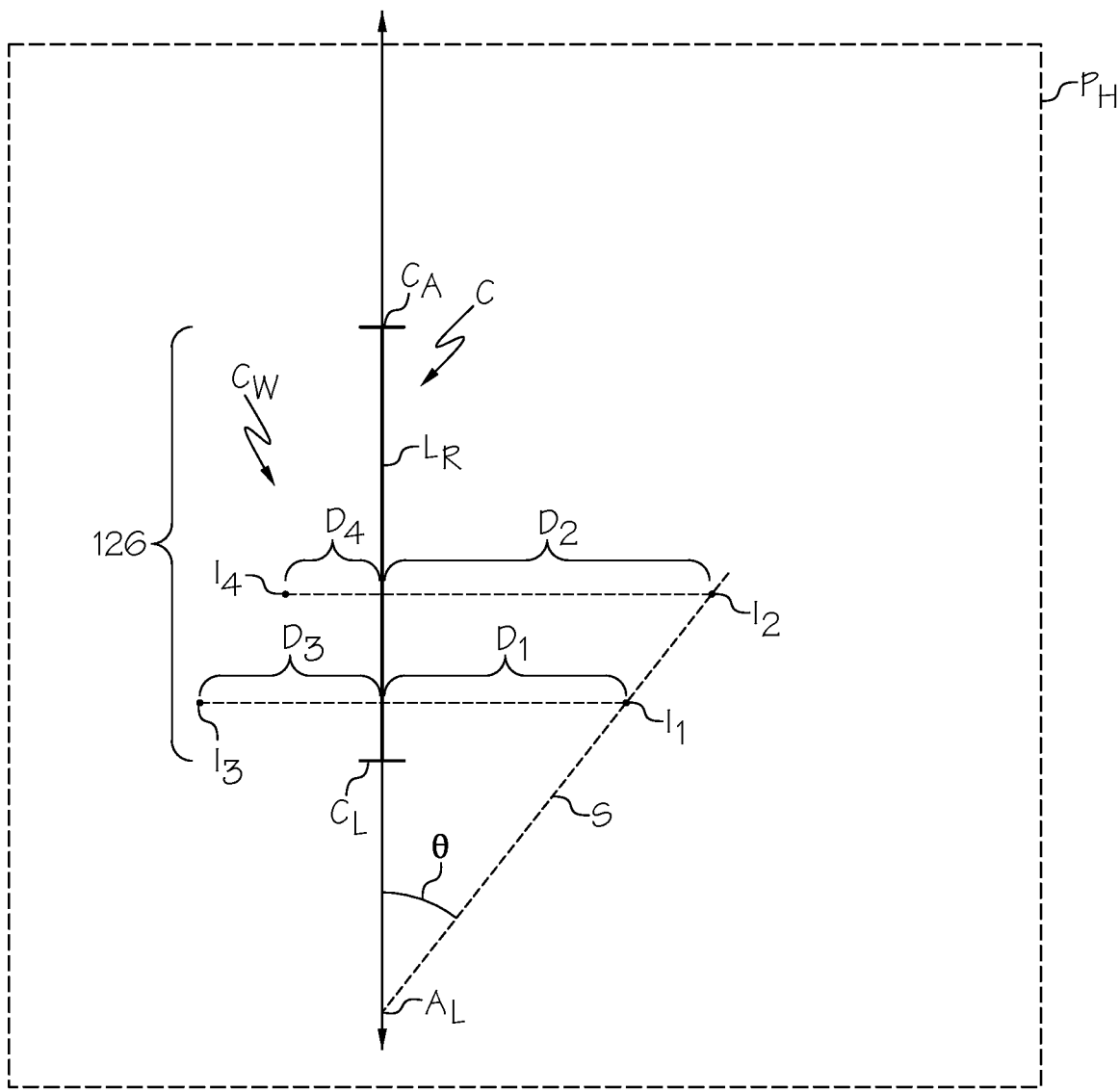
FIG. 3 is a schematic view of a plane with projected intersection points of the portion of the aircraft of FIG. 1.

Referring to FIG. 3, in one or more examples, the first intersection point $I_1$ and the second intersection point 12 define a line S. The line S intersects the reference line $L_R$ at an angle θ of about 1 degree to about 10 degrees. In another example, the line S intersects the reference line $L_R$ at an angle θ of about 2 degrees to about 7 degrees. In yet another example, the line S intersects the reference line $L_R$ at an angle θ of about 3 degrees to about 6 degrees.

Referring to FIG. 3, in one or more examples, the wing chord 126 defines a reference segment C when projected onto the horizontal plane $P_H$. The reference segment C has a leading end $C_L$ that is proximate to the trailing edge 124 of the wing 120. The reference segment C further has an aft end $C_A$ that is proximate to the leading edge 122 of the wing 120, and a length $C_W$ from the leading end $C_L$ to the aft end $C_A$. In one example, the first plane $P_1$ intersects the reference segment C at a point located approximately 5% to approximately 15% along the length $C_W$ of the reference segment C. In another example, the first plane $P_1$ intersects the reference segment C at a point located approximately 10% along the length $C_W$ of the reference segment C. Further, in one or more examples, the second plane $P_2$ intersects the reference segment C at a point located approximately 20% to approximately 40% along the length $C_W$ of the reference segment C. In another example, the second plane $P_2$ intersects the reference segment C at a point located approximately 30% along the length $C_W$ of the reference segment C.

Figure 4:
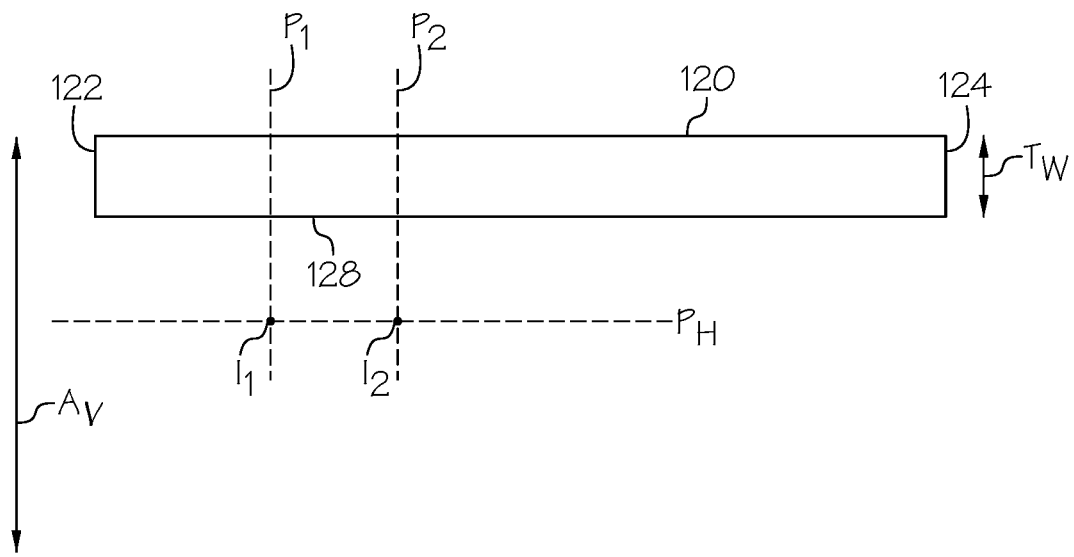
FIG. 4 is a schematic cross-sectional view of a portion of a wing of the portion of the aircraft of FIG. 1.

Referring FIG. 4, in one or more examples, the horizontal plane $P_H$ is vertically displaced along a vertical axis $A_V$ from a wing surface lowest point 128. The horizontal plane $P_H$ may be vertically displaced along a vertical axis $A_V$ from a wing surface lowest point 128 by a distance that is a function of the wing thickness $T_W$. In one example, the horizontal plane $P_H$ may be vertically displaced along a vertical axis $A_V$ from a wing surface lowest point 128 by a distance of at least 0.5 times the wing thickness $T_W$, the vertical axis $A_V$ being perpendicular to the horizontal plane $P_H$. In another example, the horizontal plane $P_H$ is vertically displaced along a vertical axis $A_V$ from a wing surface lowest point 128 by a distance of at least 1 time the wing thickness $T_W$, the vertical axis $A_V$ being perpendicular to the horizontal plane $P_H$. In yet another example, the horizontal plane $P_H$ is vertically displaced along a vertical axis $A_V$ from a wing surface lowest point 128 by a distance of at least 1.5 times the wing thickness $T_W$, the vertical axis $A_V$ being perpendicular to the horizontal plane $P_H$. Further, in one or more examples, the horizontal plane $P_H$ may be vertically displaced along a vertical axis $A_V$ from a wing surface lowest point 128 by a distance of at least 2 times the wing thickness $T_W$. The vertical axis $A_V$ is perpendicular to the horizontal plane $P_H$.

Referring to FIG. 3, in one or more examples, the outboard portion 132 of the fairing 130 is configured such that the first plane $P_1$ intersects the horizontal plane $P_H$ and the aerodynamic surface 136' of the outboard portion 132 at a third intersection point 13. The third intersection point 13 is laterally displaced from the reference line $L_R$ by a third distance $D_3$.

In one or more examples, the second plane $P_2$ intersects the horizontal plane $P_H$ and the aerodynamic surface 136' of the outboard portion 132 at a fourth intersection point 14. The fourth intersection point 14 is laterally displaced from the reference line $L_R$ by a fourth distance $D_4$. In one example, the third distance $D_3$ is greater than the fourth distance $D_4$.

Also disclosed is an aircraft comprising the fairing 130 as shown and described herein.

Figure 5:
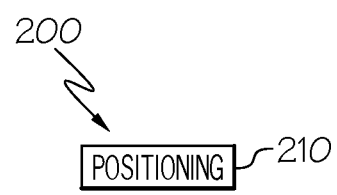
FIG. 5 is a flow diagram of a method for reducing drag on an aircraft.

Referring to FIG. 5, disclosed is method 200 for reducing drag on an aircraft 100. The aircraft 100 defines a longitudinal centerline axis A. The aircraft 100 includes a wing 120 having a leading edge 122, a trailing edge 124 aft of the leading edge 122, a wing thickness $T_W$, and a wing chord 126. The aircraft 100 further includes an engine 110 having a longitudinal axis $A_L$ that is vertically aligned with the wing chord 126 and parallel to the longitudinal centerline axis A of the aircraft 100. The engine 110 further defines a center axis $A_C$. In one example, the center axis $A_C$ is parallel to or overlaps with the longitudinal axis $A_L$. In another example, the center axis $A_C$ is offset from the longitudinal axis $A_L$ by between about 1 degree to about 10 degrees.

The aircraft 100 further includes a pylon 140 connecting the wing 120 to the engine 110 and a fairing 130 configured to be received over the pylon 140. The fairing 130 defines a horizontal plane $P_H$, a first plane $P_1$ perpendicular to the longitudinal axis $A_L$, and a second plane $P_2$ perpendicular to the longitudinal axis $A_L$, the second plane $P_2$ being aft of the first plane $P_1$. The longitudinal axis $A_L$ defines a reference line $L_R$ when projected onto the horizontal plane $P_H$.

Referring to FIG. 5, in one or more examples, the method 200 includes positioning 210 the fairing 130 over the pylon 140. Referring to FIG. 1, in one or more examples, the fairing 130 includes a fairing body 136 that defines an aerodynamic surface 136'. The aerodynamic surface 136' is a single, monolithic pieces that defines an outboard portion 132 and an inboard portion 134. In one or more examples, the inboard portion 134 of the aerodynamic surface 136' has a different geometry than the outboard portion 132 of the aerodynamic surface 136'.

The inboard portion 134 is configured such that it is angled away from the longitudinal axis $A_L$ of the engine 110. In one or more examples, the inboard portion 134 is configured such that the first plane $P_1$ intersects the horizontal plane $P_H$ and the aerodynamic surface 136' of the inboard portion 134 at a first intersection point $I_1$. The first intersection point $I_1$ is laterally displaced from the reference line $L_R$ by a first distance $D_1$.

The second plane $P_2$ intersects the horizontal plane $P_H$ and the aerodynamic surface 136' of the inboard portion 134 at a second intersection point 12. The second intersection point 12 is laterally displaced from the reference line $L_R$ by a second distance $D_2$. In one example, the second distance $D_2$ is greater than the first distance $D_1$.

Referring to FIG. 3, in one or more examples, the first intersection point $I_1$ and the second intersection point 12 define a line S. The line S intersects the reference line $L_R$ at an angle θ of about 1 degree to about 10 degrees. In another example, the line S intersects the reference line $L_R$ at an angle θ of about 2 degrees to about 7 degrees. In yet another example, the line S intersects the reference line $L_R$ at an angle θ of about 3 degrees to about 6 degrees.

Referring to FIG. 3, in one or more examples, the wing chord 126 defines a reference segment C when projected onto the horizontal plane $P_H$. The reference segment C has a leading end $C_L$, an aft end $C_A$, and a length $C_W$ from the leading end $C_L$ to the aft end $C_A$. In one example, the first plane $P_1$ intersects the reference segment C at a point located approximately 5% to approximately 15% along the length $C_W$ of the reference segment C. In another example, the first plane $P_1$ intersects the reference segment C at a point located approximately 10% along the length $C_W$ of the reference segment C. Further, in one or more examples, the second plane $P_2$ intersects the reference segment C at a point located approximately 20% to approximately 40% along the length $C_W$ of the reference segment C. In another example, the second plane $P_2$ intersects the reference segment C at a point located approximately 30% along the length $C_W$ of the reference segment C.

Referring FIG. 4, in one or more examples, the horizontal plane $P_H$ is vertically displaced along a vertical axis $A_V$ from a wing surface lowest point 128 by a distance of at least 0.5 times the wing thickness $T_W$, the vertical axis $A_V$ being perpendicular to the horizontal plane $P_H$. In another example, the horizontal plane $P_H$ is vertically displaced along a vertical axis $A_V$ from a wing surface lowest point 128 by a distance of at least 1 times the wing thickness $T_W$, the vertical axis $A_V$ being perpendicular to the horizontal plane $P_H$. In yet another example, the horizontal plane $P_H$ is vertically displaced along a vertical axis $A_V$ from a wing surface lowest point 128 by a distance of at least 1.5 times the wing thickness $T_W$, the vertical axis $A_V$ being perpendicular to the horizontal plane $P_H$. Further, in one or more examples, the horizontal plane $P_H$ may be vertically displaced along a vertical axis $A_V$ from a wing surface lowest point 128 by a distance of at least 2 times the wing thickness $T_W$. The vertical axis $A_V$ is perpendicular to the horizontal plane $P_H$.

In one or more examples, the outboard portion 132 of the fairing 130 is configured such that the first plane $P_1$ intersects the horizontal plane $P_H$ and the aerodynamic surface 136' of the outboard portion 132 at a third intersection point 13. The third intersection point 13 is laterally displaced from the reference line $L_R$ by a third distance $D_3$.

In one or more examples, the second plane $P_2$ intersects the horizontal plane $P_H$ and the aerodynamic surface 136' of the outboard portion 132 at a fourth intersection point 14. The fourth intersection point 14 is laterally displaced from the reference line $L_R$ by a fourth distance $D_4$. In one example, the third distance $D_3$ is greater than the fourth distance $D_4$.

Figure 6:
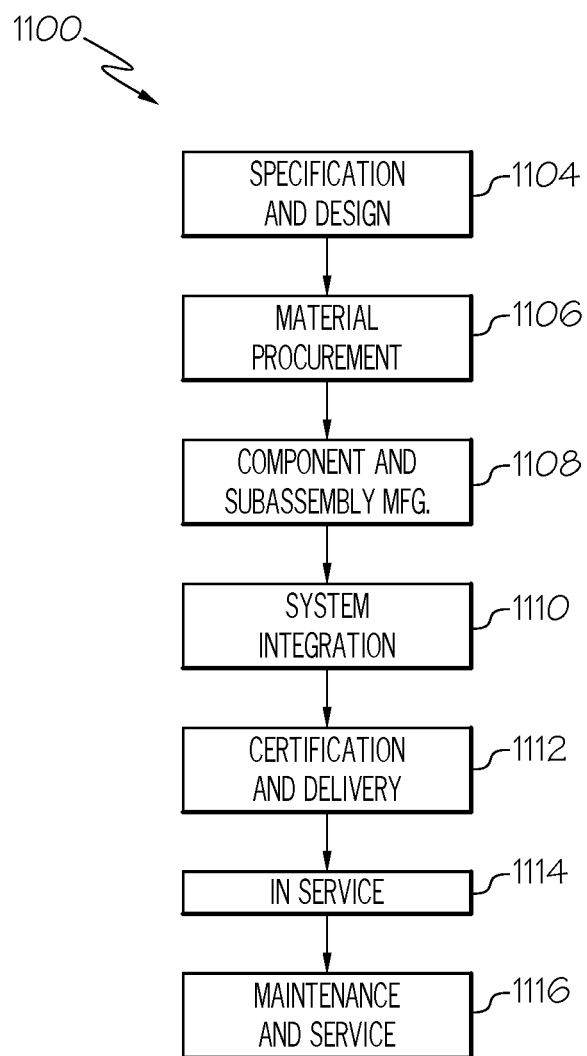
FIG. 6 is a flow diagram of an aircraft manufacturing and service methodology.

Examples of the present disclosure may be described in the context of aircraft manufacturing and service method 1100 as shown in FIG. 6 and aircraft 1102 as shown in FIG. 7. During pre-production, service method 1100 may include specification and design (block 1104) of aircraft 1102 and material procurement (Block 1106). During production, component and subassembly manufacturing (Block 1108) and system integration (Block 1110) of aircraft 1102 may take place. Thereafter, aircraft 1102 may go through certification and delivery (Block 1112) to be placed in service (Block 1114). While in service, aircraft 1102 may be scheduled for routine maintenance and service (Block 1116). Routine maintenance and service may include modification, reconfiguration, refurbishment, etc. of one or more systems of aircraft 1102.

Each of the processes of service method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 7, aircraft 1102 produced by service method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

System(s) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (Block 1114). Also, one or more examples of the system(s) and method(s), or combination thereof may be utilized during production stages component and subassembly manufacturing (Block 1108) and system integration (Block 1110), for example, by substantially expediting assembly of or reducing the cost of aircraft 1102. Similarly, one or more examples of the system or method realizations, or a combination thereof, may be utilized, for example and without limitation, while aircraft 1102 is in service (Block 1114) and/or during maintenance and service (Block 1116).

Further, the disclosure comprise examples according to the following clauses:

Clause 1. A fairing (130) for an aircraft (100), the aircraft (100) defining a longitudinal centerline axis (A) and comprising a wing (120) having a leading edge (122), a trailing edge (124) aft of the leading edge (122), a wing thickness ($T_W$), and a wing chord (126), an engine (110) defining a longitudinal axis ($A_L$) vertically aligned with the wing chord (126) and parallel with the longitudinal centerline axis (A) of the aircraft (100), and a pylon (140) connecting the wing (120) to the engine (110), the fairing (130) being received over the pylon (140), the fairing (130) defining a horizontal plane ($P_H$), a first plane ($P_1$) perpendicular to the longitudinal axis ($A_L$), and a second plane ($P_2$) perpendicular to the longitudinal axis ($A_L$), the second plane ($P_2$) being aft of the first plane ($P_1$), the longitudinal axis ($A_L$) defining a reference line ($L_R$) when projected onto the horizontal plane ($P_H$), the fairing (130) comprising: a fairing body (136) defining an aerodynamic surface (136'), the aerodynamic surface (136') comprising an outboard portion (132) and an inboard portion (134), the inboard portion (134) being configured such that: (1) the first plane ($P_1$) intersects the horizontal plane ($P_H$) and the aerodynamic surface (136') of the inboard portion (134) at a first intersection point ($I_1$), (2) the first intersection point ($I_1$) is laterally displaced from the reference line ($L_R$) by a first distance ($D_1$), (3) the second plane ($P_2$) intersects the horizontal plane ($P_H$) and the aerodynamic surface (136') of the inboard portion (134) at a second intersection point ($I_2$), (4) the second intersection point ($I_2$) is laterally displaced from the reference line ($L_R$) by a second distance ($D_2$), and (5) the second distance ($D_2$) is greater than the first distance ($D_1$).

Clause 2. The fairing (130) of Clause 1, wherein the inboard portion (134) of the aerodynamic surface (136') has a different geometry than the outboard portion (132) of the aerodynamic surface (136').

Clause 3. The fairing (130) of Clause 1 or Clause 2, wherein the first intersection point ($I_1$) and the second intersection point ($I_2$) define a line (S), and wherein the line (S) intersects the reference line ($L_R$) at an angle (θ) of about 1 degree to about 10 degrees.

Clause 4. The fairing (130) of Clause 1 or Clause 2, wherein the first intersection point ($I_1$) and the second intersection point ($I_2$) define a line (S), and wherein the line (S) intersects the reference line ($L_R$) at an angle (θ) of about 2 degrees to about 7 degrees.

Clause 5. The fairing (130) of Clause 1 or Clause 2, wherein the first intersection point ($I_1$) and the second intersection point ($I_2$) define a line (S), and wherein the line (S) intersects the reference line ($L_R$) at an angle (θ) of about 3 degrees to about 6 degrees.

Clause 6. The fairing (130) of any preceding clause, wherein the wing chord (126) defines a reference segment (C) when projected onto the horizontal plane ($P_H$), the reference segment (C) having a leading end ($C_L$), an aft end ($C_A$), and a length ($C_W$) from the leading end ($C_L$) to the aft end ($C_A$), and wherein the first plane ($P_1$) intersects the reference segment (C) at a point located approximately 5% to approximately 15% along the length ($C_W$) of the reference segment (C).

Clause 7. The fairing (130) of any preceding clause, wherein the wing chord (126) defines a reference segment (C) when projected onto the horizontal plane ($P_H$), the reference segment (C) having a leading end ($C_L$), an aft end ($C_A$), and a length ($C_W$) from the leading end ($C_L$) to the aft end ($C_A$), and wherein the first plane ($P_1$) intersects the reference segment (C) at a point located approximately 10% along the length ($C_W$) of the reference segment (C).

Clause 8. The fairing (130) of any preceding clause, wherein the wing chord (126) defines a reference segment (C) when projected onto the horizontal plane ($P_H$), the reference segment (C) having a leading end ($C_L$), an aft end ($C_A$), and a length ($C_W$) from the leading end ($C_L$) to the aft end ($C_A$), and wherein the second plane ($P_2$) intersects the reference segment (C) at a point located approximately 20% to approximately 40% along the length ($C_W$) of the reference segment (C).

Clause 9. The fairing (130) of any preceding clause, wherein the wing chord (126) defines a reference segment (C) when projected onto the horizontal plane ($P_H$), the reference segment (C) having a leading end ($C_L$), an aft end ($C_A$), and a length ($C_W$) from the leading end ($C_L$) to the aft end ($C_A$), and wherein the second plane ($P_2$) intersects the reference segment (C) at a point located approximately 30% along the length ($C_W$) of the reference segment (C).

Clause 10. The fairing (130) of any preceding clause, wherein the horizontal plane ($P_H$) is vertically displaced along a vertical axis ($A_V$) from a wing surface lowest point (128) by a distance of at least 0.5 times the wing thickness ($T_W$), the vertical axis ($A_V$) being perpendicular to the horizontal plane ($P_H$).

Clause 11. The fairing (130) of any preceding clause, wherein the horizontal plane ($P_H$) is vertically displaced along a vertical axis ($A_V$) from a wing surface lowest point (128) by a distance of at least 1 times the wing thickness ($T_W$), the vertical axis ($A_V$) being perpendicular to the horizontal plane ($P_H$).

Clause 12. The fairing (130) of any preceding clause, wherein the horizontal plane ($P_H$) is vertically displaced along a vertical axis ($A_V$) from a wing surface lowest point (128) by a distance of at least 1.5 times the wing thickness ($T_W$), the vertical axis ($A_V$) being perpendicular to the horizontal plane ($P_H$).

Clause 13. The fairing (130) of any preceding clause, wherein the horizontal plane ($P_H$) is vertically displaced along a vertical axis ($A_V$) from a wing surface lowest point (128) by a distance of at least 2 times the wing thickness ($T_W$), the vertical axis ($A_V$) being perpendicular to the horizontal plane ($P_H$).

Clause 14. The fairing (130) of any preceding clause, wherein the outboard portion (132) is configured such that:

(A) the first plane ($P_1$) intersects the horizontal plane ($P_H$) and the aerodynamic surface (136') of the outboard portion (132) at a third intersection point ($I_3$), (B) the third intersection point ($I_3$) is laterally displaced from the reference line ($L_R$) by a third distance ($D_3$), (C) the second plane ($P_2$) intersects the horizontal plane ($P_H$) and the aerodynamic surface (136') of the outboard portion (132) at a fourth intersection point ($I_4$), (D) the fourth intersection point ($I_4$) is laterally displaced from the reference line ($L_R$) by a fourth distance ($D_4$), and (E) the third distance ($D_3$) is greater than the fourth distance ($D_4$).

Clause 15. An aircraft comprising the fairing (130) of any preceding clause.

Clause 16. A method (200) for reducing drag on an aircraft (100) defining a longitudinal centerline axis (A), the aircraft (100) comprising a wing (120) having a leading edge (122), a trailing edge (124) aft of the leading edge (122), a wing thickness ($T_W$), and a wing chord (126), an engine (110) having a longitudinal axis ($A_L$) vertically aligned with the wing chord (126) and parallel to the longitudinal centerline axis (A) of the aircraft (100), a pylon (140) connecting the wing (120) to the engine (110), and a fairing (130) configured to be received over the pylon (140), the fairing (130) defining a horizontal plane ($P_H$), a first plane ($P_1$) perpendicular to the longitudinal axis ($A_L$), and a second plane ($P_2$) perpendicular to the longitudinal axis ($A_L$), the second plane ($P_2$) being aft of the first plane ($P_1$), the longitudinal axis ($A_L$) defining a reference line ($L_R$) when projected onto the horizontal plane ($P_H$), the method (200) comprising: positioning the fairing (130) over the pylon (140), the fairing (130) comprising a fairing body (136) defining an aerodynamic surface (136'), the aerodynamic surface (136') comprising an outboard portion (132) and an inboard portion (134), the inboard portion (134) being configured such that: (1) the first plane ($P_1$) intersects the horizontal plane ($P_H$) and the aerodynamic surface (136') of the inboard portion (134) at a first intersection point ($I_1$), (2) the first intersection point ($I_1$) is laterally displaced from the reference line ($L_R$) by a first distance ($D_1$), (3) the second plane ($P_2$) intersects the horizontal plane ($P_H$) and the aerodynamic surface (136') of the inboard portion (134) at a second intersection point ($I_2$), (4) the second intersection point ($I_2$) is laterally displaced from the reference line ($L_R$) by a second distance ($D_2$), and (5) the second distance ($D_2$) is greater than the first distance ($D_1$).

Clause 17. The method (200) of Clause 16, wherein the first intersection point ($I_1$) and the second intersection point ($I_2$) define a line (S), and wherein the line (S) intersects the reference line ($L_R$) at an angle ($\theta$) of about 1 degree to about 10 degrees.

Clause 18. The method (200) of Clause 16, wherein the first intersection point ($I_1$) and the second intersection point ($I_2$) define a line (S), and wherein the line (S) intersects the reference line ($L_R$) at an angle ($\theta$) of about 2 degrees to about 7 degrees.

Clause 19. The method (200) of Clause 16, wherein the first intersection point ($I_1$) and the second intersection point ($I_2$) define a line (S), and wherein the line (S) intersects the reference line ($L_R$) at an angle ($\theta$) of about 3 degrees to about 6 degrees.

Clause 20. The method (200) of any one of Clauses 16-19, wherein the first intersection point ($I_1$) is located at a distance approximately 10% from the leading edge (122) toward the trailing edge (124) relative to the wing chord (126).

Clause 21. The method (200) of any one of Clauses 16-20, wherein the second intersection point ($I_2$) is located at a distance approximately 20% to approximately 40% from the leading edge (122) toward the trailing edge (124) relative to the wing chord (126).

Clause 22. The method (200) of any one of Clauses 16-21, wherein the second intersection point ($I_2$) is located at a distance approximately 30% from the leading edge (122) toward the trailing edge (124) relative to the wing chord (126).

Clause 23. The method (200) of any one of Clauses 16-22, wherein the outboard portion (132) is configured such that: (A) the first plane ($P_1$) intersects the horizontal plane ($P_H$) and the aerodynamic surface (136') of the outboard portion (132) at a third intersection point ($I_3$), (B) the third intersection point ($I_3$) is laterally displaced from the reference line ($L_R$) by a third distance ($D_3$), (C) the second plane ($P_2$) intersects the horizontal plane ($P_H$) and the aerodynamic surface (136') of the outboard portion (132) at a fourth intersection point ($I_4$), (D) the fourth intersection point ($I_4$) is laterally displaced from the reference line ($L_R$) by a fourth distance ($D_4$), and (E) the third distance ($D_3$) is greater than the fourth distance ($D_4$).

Different examples of the fairing(s) and method(s) disclosed herein include a variety of components, features, and functionalities. It should be understood that the various examples of the fairing(s) and method(s) disclosed herein may include any of the components, features, and functionalities of any of the other examples of the fairing(s) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A fairing for an aircraft, the aircraft defining a longitudinal centerline axis and comprising a wing having a leading edge, a trailing edge aft of the leading edge, a wing thickness, and a wing chord, an engine defining a longitudinal axis vertically aligned with the wing chord and parallel with the longitudinal centerline axis of the aircraft, and a pylon connecting the wing to the engine, wherein:

the fairing is positionable over the pylon, the fairing defining a horizontal plane, a first plane settable perpendicular to the longitudinal axis, and a second plane settable perpendicular to the longitudinal axis, the second plane being aft of the first plane with respect to a direction from the leading edge to the trailing edge of the wing, and a reference line being defined on the horizontal plane as a projection of the longitudinal axis;

the fairing comprising:
a fairing body defining an aerodynamic surface, the aerodynamic surface comprising an outboard portion and an inboard portion, the inboard portion being configured such that:
the first plane intersects the horizontal plane and the aerodynamic surface of the inboard portion at a first intersection point;
the first intersection point is below the wing, aft of the leading edge, and laterally displaced from the reference line by a first distance;
the second plane intersects the horizontal plane and the aerodynamic surface of the inboard portion at a second intersection point;
the second intersection point is below the wing, aft of the first intersection point, and laterally displaced from the reference line by a second distance; and
the second distance is greater than the first distance;
the inboard portion of the aerodynamic surface that is below the wing has a different geometry than the outboard portion of the aerodynamic surface that is below the wing;
the first intersection point and the second intersection point define a line that intersects the reference line at an angle of between about 1 degree and about 10 degrees;
a reference segment is defined on the horizontal plane as a projection of the wing cord, the reference segment having a leading end, and aft end, and a length from the leading end to the aft end;
the first plane intersects the reference segment at a point located approximately 5% to approximately 15% along the length of the reference segment; and
the second plane intersects the reference segment at a point located approximately 20% to approximately 40% along the length of the reference segment.

2. The fairing of claim 1, wherein the line intersects the reference line at an angle of about 2 degrees to about 7 degrees.

3. The fairing of claim 1, wherein the line intersects the reference line at an angle of about 3 degrees to about 6 degrees.

4. The fairing of claim 1, wherein the first plane intersects the reference segment at a point located approximately 10% along the length of the reference segment.

5. The fairing of claim 1, wherein the second plane intersects the reference segment at a point located approximately 30% along the length of the reference segment.

6. The fairing of claim 1, wherein the horizontal plane is vertically displaced along a vertical axis from a wing surface lowest point by a distance of at least 0.5 times the wing thickness, the vertical axis being perpendicular to the horizontal plane.

7. The fairing of claim 1, wherein the horizontal plane is vertically displaced along a vertical axis from a wing surface lowest point by a distance of at least 1 times the wing thickness, the vertical axis being perpendicular to the horizontal plane.

8. The fairing of claim 1, wherein the horizontal plane is vertically displaced along a vertical axis from a wing surface lowest point by a distance of at least 1.5 times the wing thickness, the vertical axis being perpendicular to the horizontal plane.

9. The fairing of claim 1, wherein the horizontal plane is vertically displaced along a vertical axis from a wing surface lowest point by a distance of at least 2 times the wing thickness, the vertical axis being perpendicular to the horizontal plane.

10. The fairing of claim 1, wherein the outboard portion is configured such that:
the first plane intersects the horizontal plane and the aerodynamic surface of the outboard portion at a third intersection point;
the third intersection point is below the wing, aft of the leading edge, and laterally displaced from the reference line by a third distance;
the second plane intersects the horizontal plane and the aerodynamic surface of the outboard portion at a fourth intersection point;
the fourth intersection point is below the wing, aft of the third intersection point, and laterally displaced from the reference line by a fourth distance; and
the third distance is greater than the fourth distance.

11. The fairing of claim 1, wherein the horizontal plane bisects the fairing and is vertically displaced along a vertical axis from a wing surface lowest point by a predetermined distance relating to the wing thickness, the vertical axis being perpendicular to the horizontal plane.

12. The fairing of claim 10, wherein:
the third distance is less than the first distance; and
the fourth distance is less than the second distance
a portion of the inboard portion of the aerodynamic surface of the fairing extended along the line between the first intersection point and the second intersection point is planar; and
a portion of the outboard portion of the aerodynamic surface of the fairing extended along the line between the third intersection point and the second intersection point is planar.

13. A method for reducing drag on an aircraft defining a longitudinal centerline axis, the aircraft comprising a wing having a leading edge, a trailing edge aft of the leading edge, a wing thickness, and a wing chord, an engine having a longitudinal axis vertically aligned with the wing chord and parallel to the longitudinal centerline axis of the aircraft, a pylon connecting the wing to the engine, the method comprising:
positioning a fairing over the pylon, the fairing defining a horizontal plane, a first plane settable perpendicular to the longitudinal axis, and a second plane settable perpendicular to the longitudinal axis, the second plane being aft of the first plane with respect to a direction from the leading edge to the trailing edge of the wing, and a reference line being defined on the horizontal plane as a projections of the longitudinal axis, wherein
the fairing comprising a fairing body defining an aerodynamic surface, the aerodynamic surface comprising an outboard portion and an inboard portion, the inboard portion being configured such that:
the first plane intersects the horizontal plane and the aerodynamic surface of the inboard portion at a first intersection point,
the first intersection point is below the wing, aft of the leading edge, and laterally displaced from the reference line by a first distance,
the second plane intersects the horizontal plane and the aerodynamic surface of the inboard portion at a second intersection point,
the second intersection point is below the wing, aft of the first intersection point, and laterally displaced from the reference line by a second distance, and the second distance is greater than the first distance,
the inboard portion of the aerodynamic surface that is below the wing has a different geometry than the outboard portion of the aerodynamic surface that is below the wing;
the first intersection point and the second intersection point define a line that intersects the reference line at an angle of about 1 degree to about 10 degrees;
a reference segment is defined on the horizontal plane as a projection of the wing cord, the reference segment having a leading end, an eft end, and a length from the leading end to the aft end;
the first plane intersects the reference segment at a point located approximately 5% to approximately 15% along the length of the reference segment; and
the second plane intersects the reference segment at a point located approximately 20% to approximately 40% along the length of the reference segment.

14. The method of claim 13, wherein:
the first plane intersects the reference segment at a point located approximately 10% along the length of the reference segment; and
the second plane intersects the reference segment at a point located approximately 30% along the length of the reference segment.

15. The method of claim 13, wherein the outboard portion is configured such that:
the first plane intersects the horizontal plane and the aerodynamic surface of the outboard portion at a third intersection point,
the third intersection point is below the wing, aft of the leading edge, and laterally displaced from the reference line by a third distance,
the second plane intersects the horizontal plane and the aerodynamic surface of the outboard portion at a fourth intersection point,
the fourth intersection point is below the wing, aft of the leading edge, and laterally displaced from the reference line by a fourth distance, and
the third distance is greater than the fourth distance.

16. The method of claim 15, wherein:
the third distance is less than the first distance;
the fourth distance is less than the second distance;
a portion of the inboard portion of the aerodynamic surface of the fairing extended along the line between the first intersection point and the second intersection point is planar; and
a portion of the outboard portion of the aerodynamic surface of the fairing extended along the line between the third intersection point and the second intersection point is planar.

17. An aircraft defining a longitudinal centerline axis and comprising:
a wing having a leading edge, a trailing edge aft of the leading edge, a wing thickness, and a wing chord;
an engine defining a longitudinal axis vertically aligned with the wing chord and parallel with the longitudinal centerline axis of the aircraft;
a pylon connecting the wing to the engine; and
a fairing positioned over the pylon, the fairing defining a horizontal plane, a first plane settable perpendicular to the longitudinal axis, and a second plane settable perpendicular to the longitudinal axis, the second plane being aft of the first plane with respect to a direction from the leading edge to the trailing edge of the wing, and a reference line being defined on the horizontal plane as a projection of the longitudinal axis,
wherein:
the fairing comprises:
a fairing body defining an aerodynamic surface, the aerodynamic surface comprising an outboard portion and an inboard portion, the inboard portion being configured such that:
the first plane intersects the horizontal plane and the aerodynamic surface of the inboard portion at a first intersection point;
the first intersection point is below the wing, aft of the leading edge, and laterally displaced from the reference line by a first distance;
the second plane intersects the horizontal plane and the aerodynamic surface of the inboard portion at a second intersection point;
the second intersection point is below the wing, aft of the first intersection point, and laterally displaced from the reference line by a second distance, and the second distance is greater than the first distance;
the inboard portion of the aerodynamic surface that is below the wing has a different geometry than the outboard portion of the aerodynamic surface that is below the wing;
the first intersection point and the second intersection point define a line that intersects the reference line at an angle of between about 1 degree and about 10 degrees;
a reference segment is defined on the horizontal plane as a projection of the wing cord, the reference segment having a leading end, and aft end, and a length from the leading end to the aft end;
the first plane intersects the reference segment at a point located approximately 5% to approximately 15% along the length of the reference segment; and
the second plane intersects the reference segment at a point located approximately 20% to approximately 40% along the length of the reference segment.

18. The aircraft of claim 17, wherein:
the first plane intersects the reference segment at a point located approximately 10% along the length of the reference segment;
the second plane intersects the reference segment at a point located approximately 30% along the length of the reference segment; and
the horizontal plane is vertically displaced along a vertical axis from a wing surface lowest point by a distance of at least 0.5 times the wing thickness, the vertical axis being perpendicular to the horizontal plane.

19. The aircraft of claim 16, wherein the outboard portion of the aerodynamic surface is configured such that:
the first plane intersects the horizontal plane and the aerodynamic surface of the outboard portion at a third intersection point;
the third intersection point is below the wing, aft of the leading edge, and laterally displaced from the reference line by a third distance;
the second plane intersects the horizontal plane and the aerodynamic surface of the outboard portion at a fourth intersection point,
the fourth intersection point is below the wing, aft of the third intersection point, and laterally displaced from the reference line by a fourth distance, and
the third distance is greater than the fourth distance.

20. The aircraft of claim 19, wherein:
the third distance is less than the first distance;
the fourth distance is less than the second distance;

a portion of the inboard portion of the aerodynamic surface of the fairing extended along the line between the first intersection point and the second intersection point is planar; and a portion of the outboard portion of the aerodynamic surface of the fairing extended along the line between the third intersection point and the second intersection point is planar.

* * * * *